United States Patent
Vitzrabin et al.

(10) Patent No.: US 11,657,808 B2
(45) Date of Patent: *May 23, 2023

(54) METHOD OF ADJUSTING VOLUME OF AUDIO OUTPUT BY A MOBILE ROBOT DEVICE

(71) Applicant: Blue Ocean Robotics ApS, Odense (DK)

(72) Inventors: Efraim Vitzrabin, Odense (DK); Rune Larsen, Odense (DK); John Erland Østergaard, Odense (DK); Thomas Rubæk, Odense (DK)

(73) Assignee: Blue Ocean Robotics ApS, Odense (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,650

(22) Filed: Mar. 14, 2022

(65) Prior Publication Data

US 2022/0208181 A1 Jun. 30, 2022

Related U.S. Application Data

(63) Continuation of application No. 16/932,433, filed on Jul. 17, 2020, now Pat. No. 11,386,888.

(51) Int. Cl.
*G10L 15/183* (2013.01)
*G06V 20/20* (2022.01)
(Continued)

(52) U.S. Cl.
CPC .............. *G10L 15/183* (2013.01); *G06F 3/14* (2013.01); *G06F 3/165* (2013.01); *G06V 20/20* (2022.01);
(Continued)

(58) Field of Classification Search
CPC ....... G10L 15/183; G10L 15/22; G10L 25/51; G10L 21/0208; G06V 20/20; G06V 40/20;
(Continued)

(56) References Cited

U.S. PATENT DOCUMENTS

2010/0034397 A1* 2/2010 Nakadai ................ G01S 3/8006
381/58
2015/0347399 A1 12/2015 Aue
(Continued)

FOREIGN PATENT DOCUMENTS

| CN | 108369805 A | 8/2018 |
|----|-------------|--------|
| CN | 111239689 A | 6/2020 |
| JP | 4220858 B2 | 2/2009 |

OTHER PUBLICATIONS

Room Volume Estimation Based on Statistical Properties of Binaural Signals Using Humanoid Robot (Year: 2014).*
(Continued)

*Primary Examiner* — Mohammad K Islam
(74) *Attorney, Agent, or Firm* — Kevin Roddy; Butzel Long

(57) ABSTRACT

Implementations of the disclosed subject matter provide a method of transmitting, from a mobile robot device, sound and/or at least one image captured by a sensor to a remote user device. The mobile robot device may receive at least one first control operation for the mobile robot device to move within an area via a communications network from a remote user device. An audio signal may be transmitted based on sound received at a microphone of the mobile robot device in the area. The audio signal received from the remote user device may be output at a speaker of the mobile robot device. A volume of the audio signal output by the speaker may be adjusted based on a size of the area and on an average or a median of an amplitude of frequencies in the area based on the sound received by the microphone.

17 Claims, 10 Drawing Sheets

(51) Int. Cl.
*G06V 40/10* (2022.01)
*G06V 40/20* (2022.01)
*G06F 3/14* (2006.01)
*G06F 3/16* (2006.01)
*G10L 15/22* (2006.01)
*G10L 25/51* (2013.01)

(52) U.S. Cl.
CPC .............. *G06V 40/10* (2022.01); *G06V 40/20* (2022.01); *G10L 15/22* (2013.01); *G10L 25/51* (2013.01)

(58) Field of Classification Search
CPC ........... G06V 40/10; G06F 3/14; G06F 3/165; H04R 3/005; H03G 3/32
See application file for complete search history.

(56) References Cited

U.S. PATENT DOCUMENTS

| | | | |
|---|---|---|---|
| 2017/0011258 A1 | 1/2017 | Pitre | |
| 2017/0352351 A1* | 12/2017 | Kimura | B25J 13/089 |
| 2018/0366121 A1* | 12/2018 | Funazukuri | G06N 3/008 |
| 2019/0206400 A1* | 7/2019 | Cui | G05D 1/0016 |
| 2019/0389071 A1* | 12/2019 | Watanuki | B25J 11/0015 |
| 2020/0215699 A1* | 7/2020 | Song | H04R 1/406 |
| 2021/0016431 A1* | 1/2021 | Kim | B25J 9/1694 |
| 2021/0122049 A1* | 4/2021 | Seo | B25J 9/161 |
| 2021/0383808 A1* | 12/2021 | Yonekura | G10L 25/87 |

OTHER PUBLICATIONS

Loudness Measurement of Human Utterance to a Robot in Noisy Environment (Year: 2008).*
Extended European Search Report for App. No. EP20189480.5, dated Nov. 18, 2020, 10 pages.
Takahashi et al., "A case study of an automatic volume control interface for a telepresence system", 2015 24th IEEE International Symposium on Robot and Human Interactive Communication (RO-MAN), IEEE, Aug. 31, 2015 (Aug. 31, 2015), pp. 517-522, XP032815390, DOI: 10.1109/ROMAN.2015.7333605 [retrieved on Nov. 20, 2015].
Indian Search Report for App. No. IN202014032964, dated Jan. 25, 2022, 7 pages.
TW Search Report (including English translation) issued in App No. TW109126064, dated Feb. 10, 2022, 4 pages.

* cited by examiner

METHOD OF ADJUSTING VOLUME OF AUDIO OUTPUT BY A MOBILE ROBOT DEVICE

CROSS-REFERENCE TO RELATED APPLICATIONS

This application is a continuation of U.S. application Ser. No. 16/932,433, filed Jul. 17, 2020, the disclosure of which is incorporated by reference in its entirety.

BACKGROUND

With current telepresence robots, a person in the area of the robot typically adjusts an output volume of sound from the robot, or requests that a pilot of the telepresence robot change the output volume. A microphone type used by the telepresence robot, a distance from the person to the microphone, and the gain from the telepresence robot pilot typically make it difficult for the pilot of the telepresence robot to remotely adjust the output volume of sound from the telepresence robot.

BRIEF SUMMARY

According to an implementation of the disclosed subject matter, a method may be provided that includes transmitting, from a mobile robot device via a communications interface, sound and/or at least one image captured by a sensor to a remote user device. At least one first control operation for the mobile robot device to move within an area may be received at a mobile robot device via a communications network from a remote user device. Sound in the area may be received at a microphone of the mobile robot device, and an audio signal may be transmitted via the communications network based on the received sound. The audio signal received via the communications network may be output at a speaker of the mobile robot device. The method may include adjusting, at a controller of the mobile robot device, a volume of the audio signal output by the speaker based on a size of the area and on an average or a median of an amplitude of frequencies in the area based on the sound received by the microphone.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
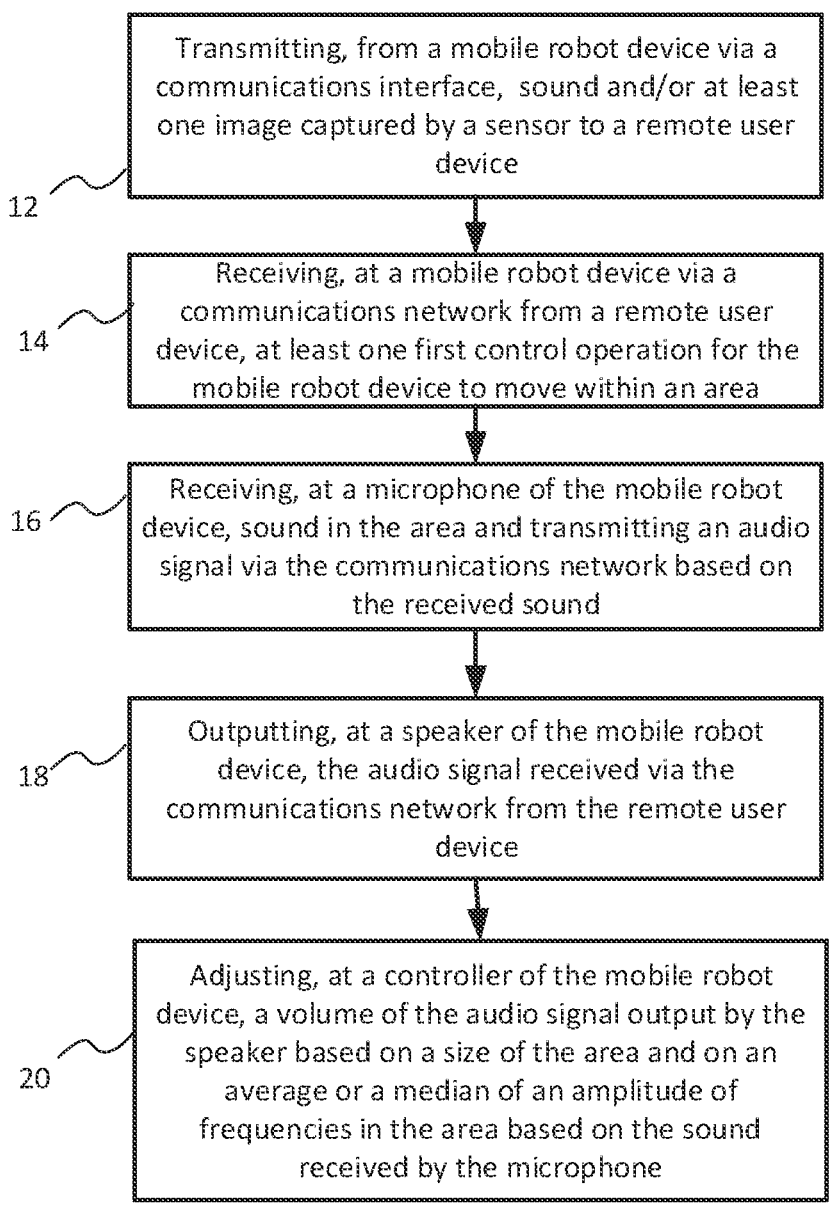
FIG. 1 shows an example method of adjusting a volume of an audio signal output by a speaker of a mobile robot device according to an implementation of the disclosed subject matter.

Implementations of the disclosed subject matter provide methods of adjusting volume and/or a frequency range of audio output by a mobile robot device within an area. Different areas that that mobile robot device may operate in may have different sonic characteristics, based on the size of the area, the surfaces and/or objects within the area, the reflectivity and/or absorption characteristics of the area, and the like. Sound in the area may be received by one or more microphones of the mobile robot device, and may be used to determine an output volume of audio signals from a speaker of the mobile robot device. The sound in the area may include, for example, voices, environmental noise (from the setting that the mobile robot is located in, such as a hospital, elder care facility, office setting, industrial setting, airplane setting, and the like), music being played, noise from HVAC (heating ventilation and air conditioning) systems, and the like. A moving average and/or median of the amplitude of the frequencies of sound in the area of the mobile robot device may be used to determine an output volume and/or frequency range for an audio signal to be output.

The mobile robot device may be controlled by a remote user device, which may provide one or more audio signals to the mobile robot device to be output by the speaker. The amplitude and/or frequencies that are output by the speaker of the mobile robot device may be similar to and/or equal to the amplitude of sound received by a microphone of the remote user device. In some implementations, the microphone of the remote user device may detect an increase in a volume of the voice of the user (i.e., the person controlling the mobile robot device—the "pilot"), and may correspondingly increase the output volume of the audio signal from the speaker at the mobile robot device.

Implementations of the disclosed subject matter improve upon current telepresence robots, where it is difficult for the pilot (i.e., the person controlling the telepresence robot) to understand the audio that is output from the robot itself, because of echo cancellation. Typically, humans adjust the loudness of their voice according to the background volume that they hear. However, the sound output from the speaker of telepresence robot is influenced by the gain, microphone type, a distance from the microphone of the pilot, as well as the gain from the telepresence robot, the pilot does not know the output volume of sound by the telepresence robot. Typically, the pilot adjusts the volume, or people that are in the same area as the robot adjust the output volume from the robot themselves or request that the pilot change the output volume.

Implementations of the disclosed subject matter may provide a mobile robot device that may change the frequency of the audio received from the user (i.e., pilot) of the remote user device. Some implementations may change the frequency of sound that a microphone of the mobile robot device receives, and may transmit an audio signal with the changed frequency to the remote user device. A mode may be selected (e.g., at the mobile robot device and/or the remote user device) which may change the frequency of the audio signal (e.g., for one or more persons with a reduced frequency range of hearing, such as older people). In some implementations, the mode may be selected when a particular person is detected by a sensor of the mobile robot device. In some implementations, the mode may be automatically selected at the mobile robot device and/or the remote user device based on the detection of the particular person. When operating in this mode, the frequency range of the incoming sound may be compressed to a predetermined range of frequencies. In some implementations, a mode may be selected that may adjust the frequency range of the audio signal for a particular range that may be audible by particular people (e.g., children and/or younger people that may be able to hear higher frequency ranges of sound).

In some implementations, the mobile robot device may be deployed in an area that has a different natural language from that of the pilot using the remote user device. The mobile robot device may be configured to output an audio signal that has the natural language of the local area that the mobile robot device is deployed in. That is, the speech of the audio signal may be translated, and a new audio signal may be generated from the translated speech for output by the mobile robot device.

In some implementations, the mobile robot device may identify one or more people in the area. Images of the one or more people may be captured by one or more sensors of the mobile robot device, and the one or more people may be identified based, for example, on one or more database records. Information for an identified person (e.g., name, title, contact information, language(s) spoken, hearing abilities, and the like) may be displayed for the pilot of the remote user device. From a retrieved database record of an identified person, the audio output by the mobile robot device may be in the natural language of the identified person. The speech of the audio signal may be translated, and a new audio output signal in the natural language of the identified person may be output by the mobile robot device. Speech by the identified person may be captured by the microphone of the mobile robot, translated, and transmitted to the remote user device to be output as an audio signal, and/or as a transcription of the text of the speech. In some implementations, one or more sensors of the mobile robot may be used to determine an emotion of a person, and provide the determined emotional state of the person to the remote user device.

FIG. 1 shows an example method 10 of adjusting a volume of an audio signal output by a speaker of a mobile robot according to an implementation of the disclosed subject matter. At operation 12, sound and/or at least one image captured by a sensor (e.g., sensor 102b, 102c shown in FIGS. 8-10) may be transmitted from a mobile robot device (e.g., mobile robot device 100 shown in FIGS. 8-11) via a communications interface (e.g., network interface 116 shown in FIG. 10 that may be communicatively coupled to network 130 shown in FIG. 11) to a remote user device (e.g., remote user device 170 shown in FIG. 11).

At operation 14, the mobile robot device may receive via a communications network (e.g., communications network 130 shown in FIG. 11) from the remote user device at least one first control operation for the mobile robot device to move within an area. The control operation may include a direction of movement, speed of movement, selection of one or more sensors (e.g., sensor 102a, 102b, 102c, and/or 102d) and/or microphone (e.g., microphone 103) to receive data and/or sound from (e.g., images, distance to objects, and the like).

At operation 16, a microphone (e.g., microphone 103 shown in FIGS. 8-10) of the mobile robot device may receive sound in the area. The mobile robot may transmit an audio signal via the communications network based on the received sound. For example, the microphone and/or the controller (e.g., controller 114 shown in FIG. 10) may generate the audio signal to be transmitted via the network interface (e.g., network interface 116 shown in FIG. 10) to the remote user device.

At operation 18, a speaker (e.g., speaker 107 shown in FIGS. 8-10) of the mobile robot device may output an audio signal received via the communications network from the remote user device. In some implementations, the audio signal may be output at the speaker of the mobile robot device based on volume change information included in the received audio signal. The controller may adjust a frequency range of the audio signal to be output by the speaker. The frequency range may be adjusted based on a predetermined frequency range to be heard by a person within a predetermined distance from the mobile robot device, and/or a selected frequency range capable of being heard by the person within the predetermined distance from the mobile robot device.

Figure 6:
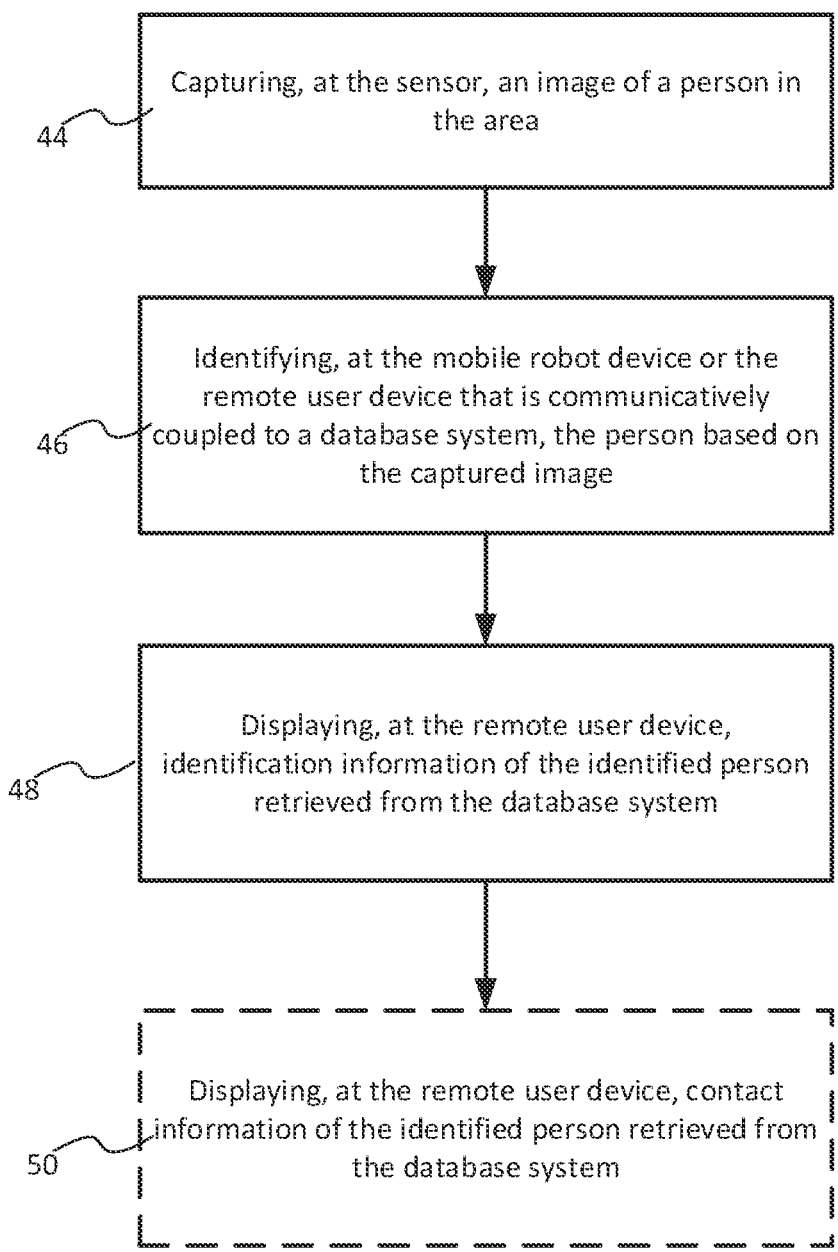
FIG. 6 shows that the example method of FIG. 1 may include a method of identifying a person based on a captured image according to an implementation of the disclosed subject matter.

For example, the frequency range may be adjusted so that a person located within the area of the mobile robot device that is hearing impaired for a particular frequency range or is unable to hear sound within a particular frequency range (e.g., 12-20 kHz) can hear the audio signal output by the speaker. In another example, the frequency range of the audio signal may be adjusted so that people that are able to hear a particular frequency range may hear the sound (e.g., children and/or young adults that may hear high frequencies, such as 15 kHz-20 kHz). In some implementations, one or more people in the area of the mobile robot device may be identified (e.g., by comparing their image captured by one or more of the sensors of the robot with a database of images, such as shown in FIG. 6 and described below), and the frequency range of the audio signal may be adjusted based on a database record.

At operation 20, a controller (e.g., controller 114 shown in FIG. 10) of the mobile robot device may adjust a volume of the audio signal output by the speaker based on a size of the area and on an average or a median of an amplitude of frequencies in the area based on the sound received by the microphone. In some implementations, the controller may adjust the volume of the audio signal output by the speaker based on a volume of the received sound at the microphone. In some implementations, an amplitude of sound output by the remote user device may be equalized to the average or median of the amplitude of the frequencies output by the mobile robot device in the area.

Figure 8:
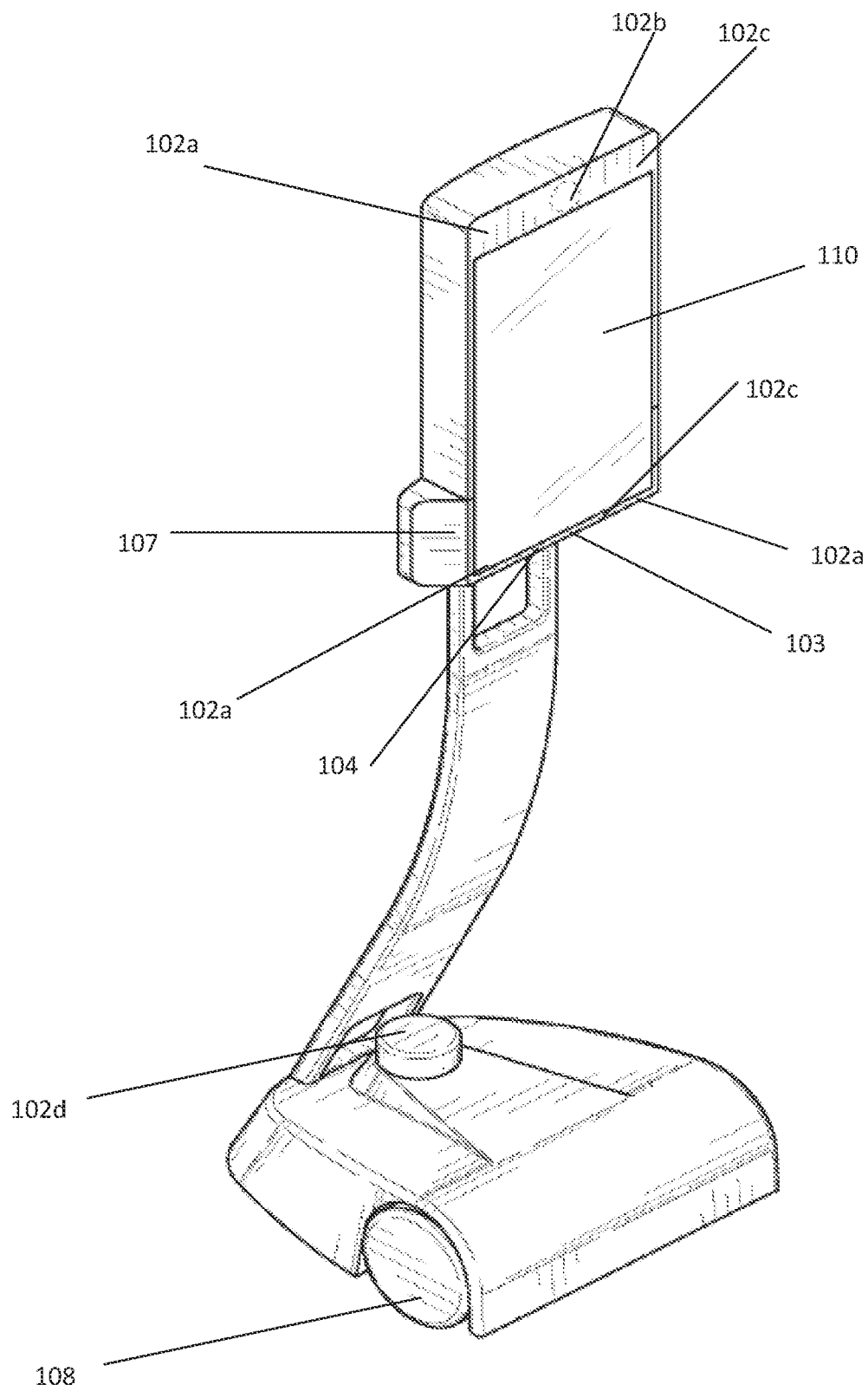
FIGS. 8-9 show an example mobile robot device according to an implementation of the disclosed subject matter.
Figure 9:
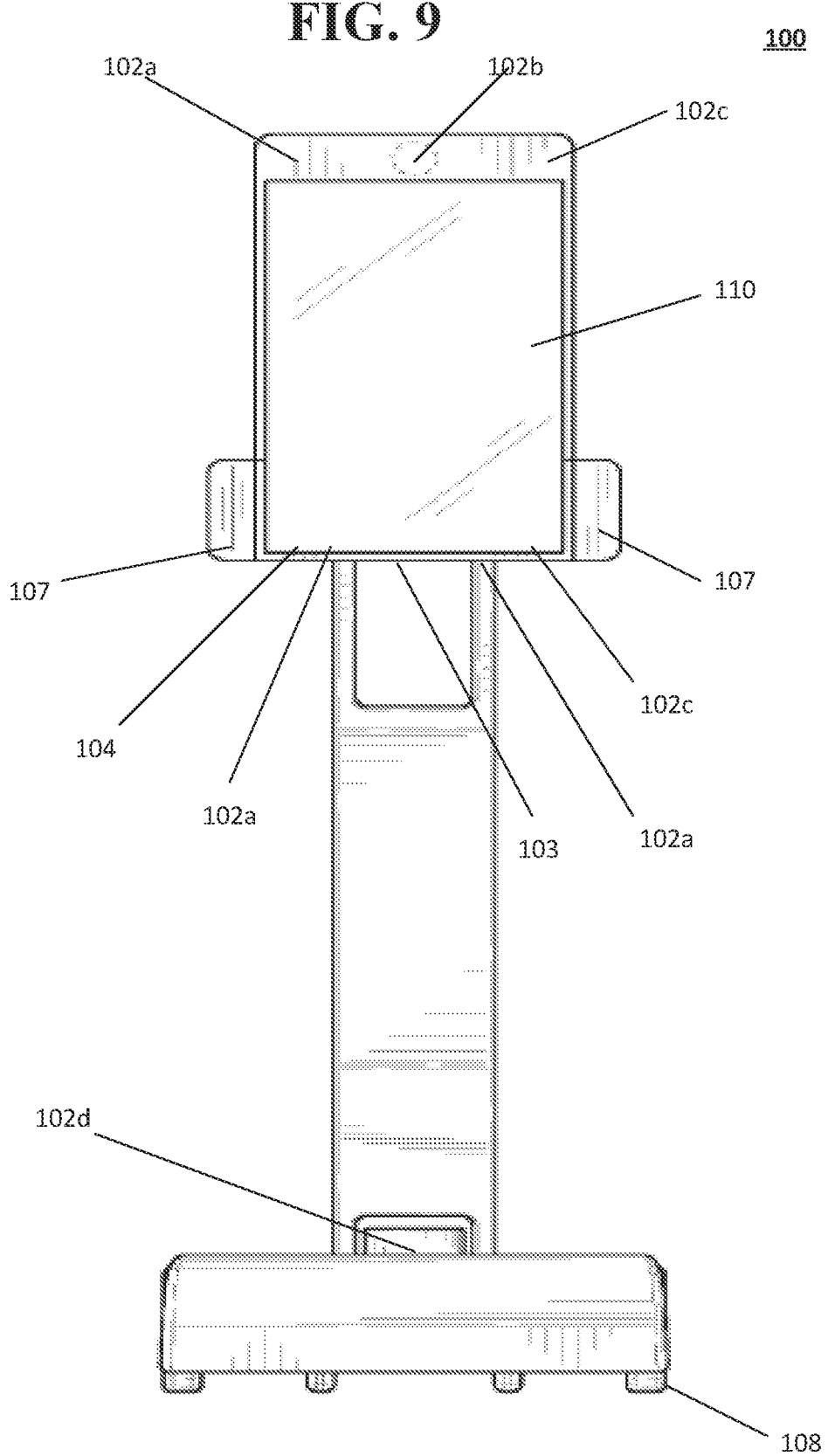
Figure 10:
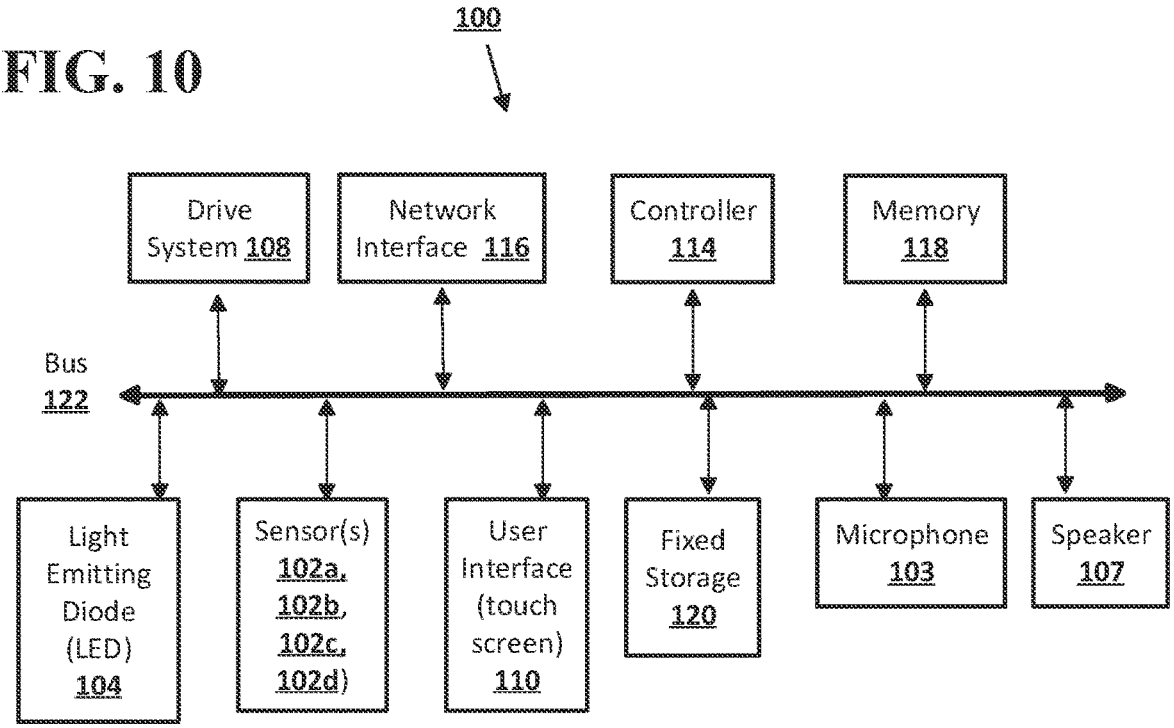
FIG. 10 shows an example configuration of the mobile robot of FIGS. 8-9 according to an implementation of the disclosed subject matter.

An image of a user of the remote user device received by the mobile robot device via the communications network may be displayed on a display (e.g., user interface 110, which may be a touch screen, shown in FIGS. 8-10) of the mobile robot device. This may allow people in the area of the mobile robot device to see the pilot of the mobile robot device.

Figure 2:
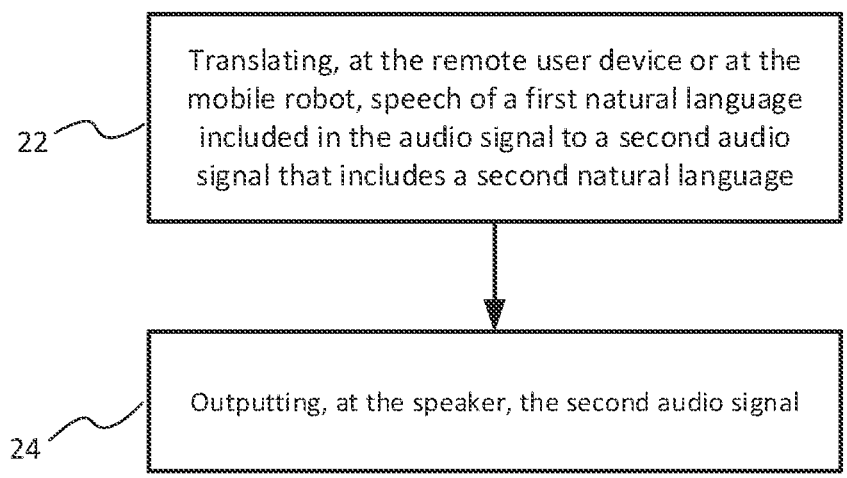
FIGS. 2-4 show that the example method of FIG. 1 may include methods of translating speech according to implementations of the disclosed subject matter.
Figure 3:
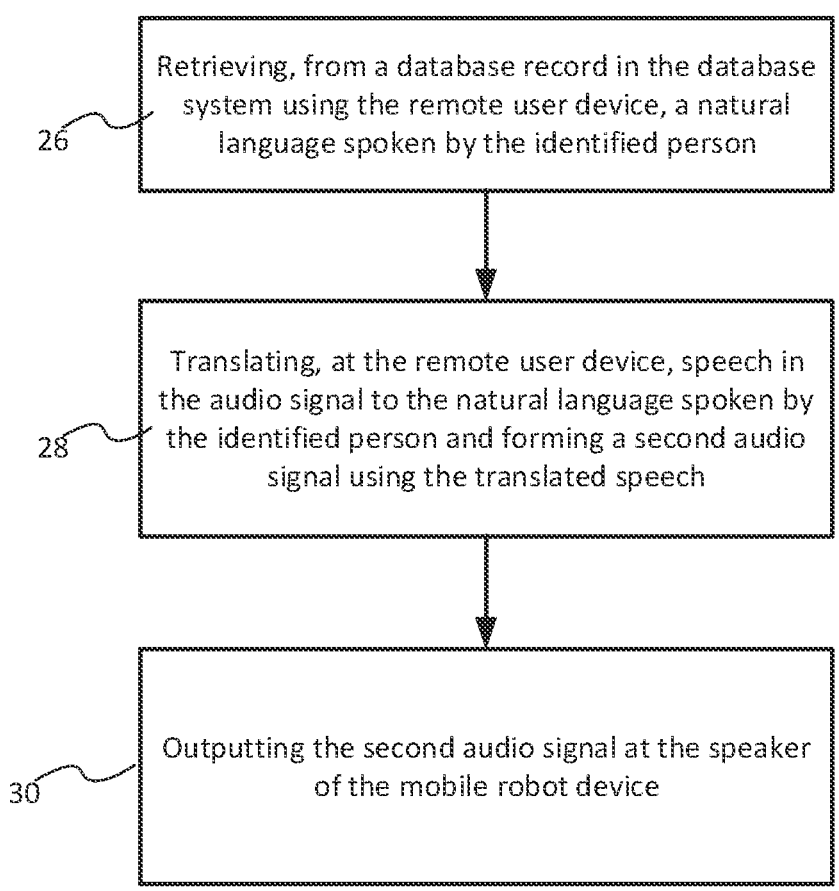
Figure 4:
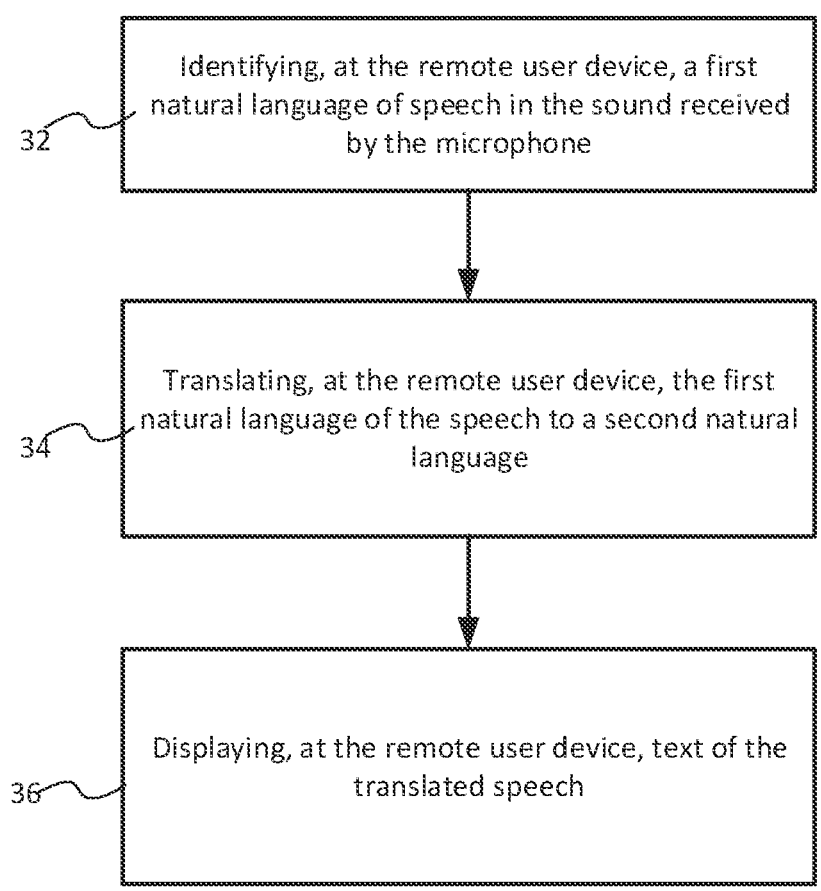

FIGS. 2-4 show that the example method of FIG. 1 may include methods of translating speech according to implementations of the disclosed subject matter. For example, FIG. 2, shows that at operation 22 the remote user device and/or the mobile robot may translate speech of a first natural language included in the audio signal to a second audio signal that includes a second natural language. The natural languages may be English, French, Spanish, German, Japanese, Chinese, Korean, Hindi, Arabic, Russian, and the like. At operation 24, the speaker of the mobile robot device may output the second audio signal.

In some implementations, the mobile robot device and/or the remote user device may translate speech of a first natural language of the audio signal into text of the speech in a second natural language to be displayed on a display of the remote user device. The mobile robot device or the remote user device may translate speech of a first natural language of the audio signal into a second audio signal having a second natural language to be output by a speaker of the remote user device.

In the example method shown in FIG. 3, a natural language spoken by an identified person may be retrieved from a database record in a database system (e.g., database 150 shown in FIG. 11) using the remote user device at operation 26. That is, one or more sensors of the mobile robot device may capture an image of the person, and the captured image may be compared to a database (e.g., database 150 shown in FIG. 11) of images to determine an identity of the person (e.g., as shown in FIG. 6 and described below). The database record for the person may include, for example, a name, contact information, title, languages spoken, and the like. At operation 28, the remote user device may translate speech in the audio signal to the natural language spoken by the identified person and forming a second audio signal using the translated speech. At operation 30, the second audio signal may be output at the speaker of the mobile robot device.

In the example method shown in FIG. 4, the remote user device may identify a first natural language of speech in the sound received by a microphone of the mobile robot device at operation 32. At operation 34, the remote user device may translate the first natural language of the speech to a second natural language. For example, a person in the area of the mobile robot device may speak a different natural language than that of the pilot (i.e., the user of the remote user device). The remote user device may translate the language spoken by the person in the area of the robot to the language of the pilot. In some implementations, the remote user device may display text of the translated speech, as shown at operation 36.

Figure 5:
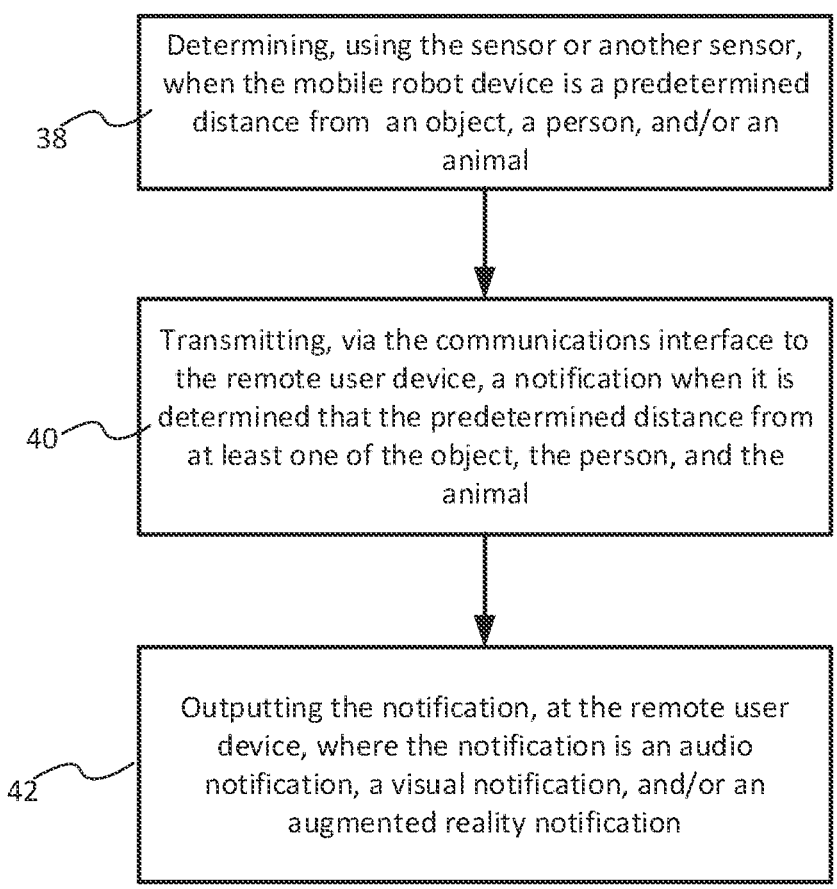
FIG. 5 shows that the example method of FIG. 1 may include a method of determining when the mobile robot is within a predetermined distance from an object, a person, and/or an animal and transmitting a notification according to an implementation of the disclosed subject matter.

FIG. 5 shows that the example method of FIG. 1 may include a method of determining when the mobile robot is within a predetermined distance from an object, a person, and/or an animal and transmitting a notification according to an implementation of the disclosed subject matter. At operation 38, using one or more sensors (e.g., sensor 102a, 102b, 102c, 102d shown in FIGS. 8-10), it may be determined when the mobile robot device is a predetermined distance from an object, a person, and/or an animal. At operation 40, a notification may be transmitted via the communications interface of the mobile robot to the remote user device, when it is determined that the predetermined distance from at least one of the object, the person, and the animal. At operation 42, the remote user device may output the notification, which may be an audio notification, a visual notification, and/or an augmented reality notification.

FIG. 6 shows that the example method of FIG. 1 may include a method of identifying a person based on a captured image according to an implementation of the disclosed subject matter. At operation 44, the sensor (e.g., sensor 102b, 102c shown in FIGS. 8-10) may capture an image of a person in the area. At operation 46, the mobile robot device or the remote user device that is communicatively coupled to a database system (e.g., database 150 shown in FIG. 11) may identify the person based on the captured image. In some implementations, the remote user device may display identification information of the identified person retrieved from the database system at operation 50. The remote user device may display contact information of the identified person retrieved from the database system.

Figure 7:
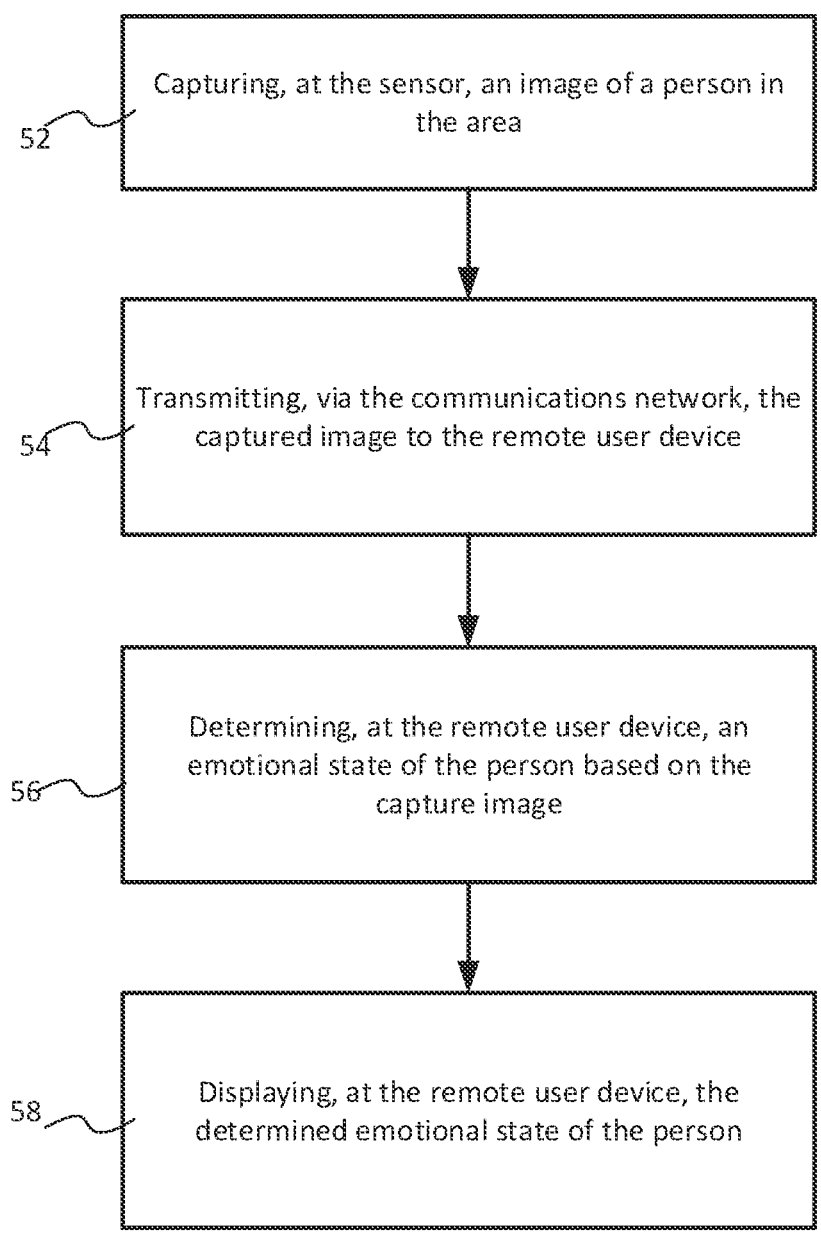
FIG. 7 shows that the example method of FIG. 1 may include a method of determining an emotional state of a person in the area near the mobile robot device according to an implementation of the disclosed subject matter.

FIG. 7 shows that the example method of FIG. 1 may include a method of determining an emotional state of a person in the area near the mobile robot device according to an implementation of the disclosed subject matter. At operation 52, the sensor (e.g., sensor 102b, 102c shown in FIGS. 8-10) may capture an image of a person in the area. At operation 54, the captured image may be transmitted via the communications network (e.g., network 130 shown in FIG. 11), to the remote user device (e.g., remote user device 170). At operation 56, the remote user device may determine an emotional state of the person based on the capture image. At operation 58, the remote user device may display the determined emotional state of the person. The emotional state may include such emotions as sad, happy, angry, confusion, fear, and the like.

FIGS. 8-9 show an example mobile robot device 100 according to an implementation of the disclosed subject matter. The mobile robot device 100 may have a plurality of sensors. Sensor 102a may be a time-of-flight sensor. Sensor 102b may be a RGB (a Red, Green, Blue image sensor) camera and/or image sensor, and sensor 102c may be a RGB-D (a RGB depth camera). In some implementations, sensor 102b, 102c may be a stereo vision sensor, 3D camera, an image sensor, thermal camera, a structured light camera, or the like. Sensor 102d may be an a two-dimensional (2D) Light Detection and Ranging (LiDAR) sensor, a three-dimensional (3D) LiDAR sensor, and/or a radar (radio detection and ranging) sensor, ultrasonic sensor, or the like.

The mobile robot device 100 may include at least one microphone 103. In some implementations, the mobile robot device 100 may have a plurality of microphones 103 arranged in an array.

The mobile robot device 100 may include an light emitting diode (LED), organic light emitting diode (OLED), lamp, and/or any suitable light source that may be controlled by the controller (e.g., controller 114 shown in FIG. 10) to illuminate a portion of the area for navigation of the mobile robot device.

The mobile robot 100 may include a motor to drive the drive system 108 to move the mobile robot in an area, such as a room, a building, or the like. The drive system 108 may include wheels, which may be adjustable so that the drive system 108 may control the direction of the mobile robot 100.

The mobile robot device 100 may include one or more speakers 107. In some implementations, such as shown in FIG. 9, speakers 107 may be disposed on first and second sides (e.g., left and right sides) of display 110. The display 110 may be a LCD (liquid Crystal Display), and OLED display, or the like to display images, such as those received from the remote user device 170.

FIG. 10 shows example components of the mobile robot 100 suitable for providing the implementations of the disclosed subject matter. The mobile robot 100 may include a bus 122 which interconnects major components of the mobile robot 100, such as the drive system 108, a network interface 116 operable to communicate with one or more remote devices via a suitable network connection, the controller 114, a memory 118 such as Random Access Memory (RAM), Read Only Memory (ROM), flash RAM, or the like, the LED light source 104, sensor 102*a*, sensor 102*b*, sensor 102*c*, sensor 102*d*, a user interface 110 that may include one or more controllers, a display and associated user input devices such as a touch screen, a fixed storage 120 such as a hard drive, flash storage, and the like, a microphone 103, and a speaker 107 to output an audio notification and/or other information.

The bus 122 allows data communication between the controller 114 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the mobile robot 100 are generally stored on and accessed via a computer readable medium (e.g., fixed storage 120), such as a solid state drive, hard disk drive, an optical drive, solid state drive, or other storage medium.

Figure 11:
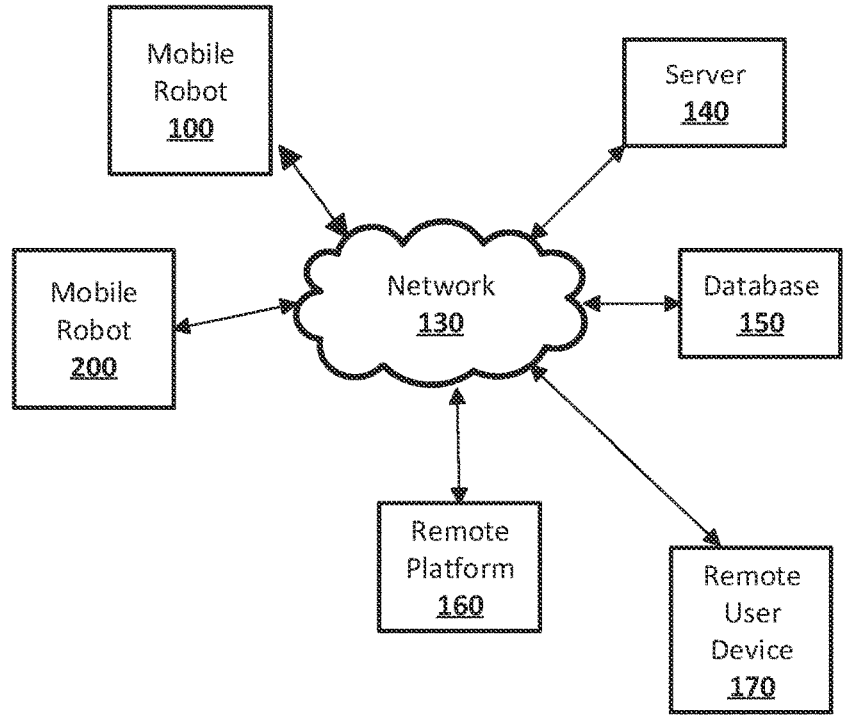
FIG. 11 shows a network configuration which may include a plurality of mobile robots according to implementations of the disclosed subject matter.

The network interface 116 may provide a direct connection to a remote server (e.g., server 140, database 150, remote platform 160, and/or remote user device 170 shown in FIG. 11) via a wired or wireless connection (e.g., network 130 shown in FIG. 11). The network interface 116 may provide such connection using any suitable technique and protocol as will be readily understood by one of skill in the art, including digital cellular telephone, WiFi, Bluetooth®, near-field, and the like. For example, the network interface 116 may allow the mobile robot 100 to communicate with other computers via one or more local, wide-area, or other communication networks, as described in further detail below. The mobile robot may transmit data via the network interface to the remote user device, including data and/or images from the sensors, audio signal generated from sound captured by the microphone, and the like.

Many other devices or components (not shown) may be connected in a similar manner. Conversely, all of the components shown in FIG. 10 need not be present to practice the present disclosure. The components can be interconnected in different ways from that shown. Code to implement the present disclosure can be stored in computer-readable storage media such as one or more of the memory 118, fixed storage 120, or on a remote storage location.

FIG. 11 shows an example network arrangement according to an implementation of the disclosed subject matter. The mobile robot 100 described above, and/or a similar mobile robot 200, may connect to other devices via network 130. The network 130 may be a local network, wide-area network, the Internet, or any other suitable communication network or networks, and may be implemented on any suitable platform including wired and/or wireless networks. The mobile robot 100 and/or mobile robot 200 may communicate with one another, and/or may communicate with one or more remote devices, such as server 140, database 150, remote platform 160, and/or remote user device 170. The remote devices may be directly accessible by the mobile robot 100, 200 or one or more other devices may provide intermediary access such as where a server 140 provides access to resources stored in a database 150. The mobile robot 100, 200 may access remote platform 160 or services provided by remote platform 160 such as cloud computing arrangements and services. The remote platform 160 may include one or more servers 140 and/or databases 150. The remote user computer 170 may control mobile robot 100, 200 and/or receive sensor data, one or more images, audio signals and the like via the network 130. The remote user device may transmit one or more images, commands, audio signals, and the like to the mobile robot 100, 200.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as solid state drives, DVDs, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may include using hardware that has a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, at a microphone of a mobile robot device, sound in an area that the mobile robot is located;
receiving, at a communications interface of the mobile robot device, an audio signal; and
adjusting, at a controller of the mobile robot device based on the sound received by the microphone, a volume of the received audio signal to be output by the speaker based on a size of the area and an average or a median of an amplitude of frequencies in the area.

2. The method of claim 1, wherein the adjusting the volume further comprises:
adjusting, at the controller of the mobile robot device, the volume of the audio signal output by the speaker based on a volume of the received sound at the microphone.

3. The method of claim 1, wherein the outputting the audio signal at the speaker further comprises:
outputting the audio signal, at the speaker of the mobile robot device, based on volume change information included in the received audio signal.

4. The method of claim 1, further comprising:
equalizing an amplitude of sound output by a remote user device communicatively coupled to the mobile robot device to the average or median of the amplitude of the frequencies in the area.

5. The method of claim 1, further comprising:
adjusting, at the controller of the mobile robot device, a frequency range of the audio signal to be output by the speaker.

6. The method of claim 5, wherein the frequency range is adjusted based on at least one from the group consisting of: a predetermined frequency range to be heard by a person within a predetermined distance from the mobile robot device, and a selected frequency range capable of being heard by the person within the predetermined distance from the mobile robot device.

7. The method of claim 1, further comprising:
translating, at the mobile robot device or at a remote device communicatively coupled to the mobile robot device, speech of a first natural language included in the audio signal to a second audio signal that includes a second natural language; and
outputting, at the speaker, the second audio signal.

8. The method of claim 1, further comprising:
translating, at the mobile robot device or a remote device communicatively coupled to the mobile robot device, speech of a first natural language of the audio signal into text of the speech in a second natural language to be displayed on a display of the remote user device.

9. The method of claim 1, further comprising:
translating, at the mobile robot device or a remote user device communicatively coupled to the mobile robot device, speech of a first natural language of the audio signal into a second audio signal having a second natural language to be output by a speaker of the remote user device.

10. The method of claim 1, further comprising:
displaying, on a display of the mobile robot device, an image of a user of a remote user device received by the mobile robot device via a communications network.

11. The method of claim 1, further comprising:
determining, using the sensor or another sensor, when the mobile robot device is a predetermined distance from at least one of the group consisting of: an object, a person, and an animal; and
transmitting, via the communications interface to the remote user device, a notification when it is determined that the predetermined distance from at least one of the object, the person, and the animal.

12. The method of claim 11, further comprising:
outputting the notification, at a remote user device communicatively coupled to the mobile robot device, wherein the notification is at least one selected from the group consisting of: an audio notification, a visual notification, and an augmented reality notification.

13. The method of claim 1, further comprising:
capturing, at the sensor, an image of a person in the area;
identifying, at the mobile robot device or the remote user device that is communicatively coupled to a database system, the person based on the captured image; and
displaying, at a remote device communicatively coupled to the mobile robot device, identification information of the identified person retrieved from the database system.

14. The method of claim 13, further comprising:
displaying, at the remote device, contact information of the identified person retrieved from the database system.

15. The method of claim 13, wherein the outputting of the audio signal comprises:
retrieving, from a database record in the database system using a remote user device, a natural language spoken by the identified person;
translating, at the remote user device, speech in the audio signal to the natural language spoken by the identified person and forming a second audio signal using the translated speech; and
outputting the second audio signal at the speaker of the mobile robot device.

16. The method of claim 13, wherein the outputting of the audio signal comprises:
identifying, at the remote user device, a first natural language of speech in the sound received by the microphone;
translating, at the remote user device, the first natural language of the speech to a second natural language;
displaying, at the remote user device, text of the translated speech.

17. The method of claim 1, further comprising:
capturing, at the sensor, an image of a person in the area;
transmitting, via the communications network, the captured image to the remote user device;
determining, at the remote user device, an emotional state of the person based on the capture image; and
displaying, at the remote user device, the determined emotional state of the person.

* * * * *